United States Patent [19]
Cone

[11] Patent Number: 5,115,523
[45] Date of Patent: May 26, 1992

[54] CONVERTIBLE INFANT RESTRAINT DEVICE

[75] Inventor: Richard E. Cone, Dayton, Ohio

[73] Assignee: Cosco, Inc., Columbus, Ind.

[21] Appl. No.: 653,788

[22] Filed: Feb. 11, 1990

Related U.S. Application Data

[63] Continuation of Ser. No. 256,040, Oct. 11, 1988, Pat. No. 4,998,307.

[51] Int. Cl.$^5$ ............................................. A47D 7/04
[52] U.S. Cl. ............................................. 5/94; 5/101; 297/250; 297/464; 297/368
[58] Field of Search ................................ 5/94, 101, 102; 297/250, 255, 256, 216, 464, 473, 310, 368, 369, 483, 484, 183

[56] References Cited

U.S. PATENT DOCUMENTS

| | | |
|---|---|---|
| 567,096 | 9/1896 | Harvey et al. |
| 1,876,111 | 9/1932 | Guelpen . |
| 2,286,784 | 6/1942 | Benzick et al. |
| 2,633,895 | 4/1953 | Battles . |
| 2,664,140 | 12/1953 | Kindelsberger . |
| 2,676,336 | 4/1954 | Gilmer . |
| 2,720,911 | 10/1955 | Lantz . |
| 2,777,502 | 1/1957 | Travis . |
| 2,845,234 | 7/1958 | Cushman et al. |
| 3,054,637 | 9/1962 | Pambello . |
| 3,159,850 | 12/1964 | Aldrich et al. |
| 3,203,731 | 8/1965 | Krueger . |
| 3,361,475 | 1/1968 | Villiers . |
| 3,366,294 | 1/1968 | Stephenson . |
| 3,381,315 | 5/1968 | Glassberg . |
| 3,385,633 | 5/1968 | Aizley . |
| 3,528,703 | 9/1970 | Ohta . |
| 3,579,673 | 5/1971 | Hirschey . |
| 3,833,946 | 9/1974 | Von Wimmersperg . |
| 3,994,513 | 11/1976 | Courtis et al. |
| 4,169,626 | 10/1979 | Hollar, Jr. |
| 4,186,961 | 2/1980 | Farrell, Jr. et al. |

(List continued on next page.)

FOREIGN PATENT DOCUMENTS

| | | |
|---|---|---|
| 0009439 | 4/1980 | European Pat. Off. |
| 2651141 | 5/1977 | Fed. Rep. of Germany . |
| 3445497 | 6/1986 | Fed. Rep. of Germany . |
| 2306853 | 11/1976 | France . |
| 2347010 | 11/1976 | France . |
| 86/02050 | 4/1986 | PCT Int'l Appl. |
| 258398 | 9/1926 | United Kingdom . |
| 1424093 | 2/1976 | United Kingdom . |
| 2072003 | 9/1981 | United Kingdom . |

Primary Examiner—Renee S. Luebke
Assistant Examiner—F. Saether
Attorney, Agent, or Firm—Barnes & Thornburg

[57] ABSTRACT

An infant restraint device is provided for securing and supporting an infant inside a motor vehicle. The device includes a shell assembly having upper and lower shell portions pivotally coupled together. The upper shell portion can be positioned in either a first generally planar orientation or in a second angular orientation with respect to the lower shell portion. A locking mechanism is provided for securing the upper and lower shell portions together in either the first or second orientations. In the first generally planar orientation, the device provides a car bed for the infant. In the second angular orientation, the device provides a standard rear-facing infant seat. A collapsible lower support surface provides a seat for the infant when the device is in the angular orientation. The lower support surface bends along a flexible portion when the upper shell portion of the device moves to the planar orientation to provide a generally planar support surface for the infant. The infant is held in position within the device by a lower strap and first and second shoulder straps. A slide mechanism is provided to permit lateral movement of the first and second shoulder straps with respect to the shell assembly without misaligning or tangling the shoulder straps. An adjustment strap is provided for simultaneously adjusting the position of the lower strap and the first and second shoulder straps after the infant is situated inside the shell assembly.

32 Claims, 3 Drawing Sheets

U.S PATENT DOCUMENTS

| | | |
|---|---|---|
| 4,231,612 | 11/1980 | Meeker . |
| 4,274,674 | 6/1981 | Deloustal . |
| 4,366,587 | 1/1983 | Takada . |
| 4,376,551 | 3/1983 | Cone . |
| 4,436,341 | 3/1984 | Converse . |
| 4,500,133 | 2/1985 | Nakao et al. . |
| 4,500,135 | 2/1985 | Kincheloe . |
| 4,501,032 | 2/1985 | Heath et al. . |
| 4,615,562 | 10/1986 | Bell et al. . |
| 4,634,177 | 1/1987 | Meeker . |
| 4,688,850 | 8/1987 | Brownlie et al. . |
| 4,709,960 | 12/1987 | Launes . |
| 4,743,063 | 5/1988 | Foster, Jr. . |
| 4,754,999 | 7/1988 | Kain . |
| 4,762,364 | 8/1988 | Young . |
| 4,883,243 | 11/1989 | Herndon . |

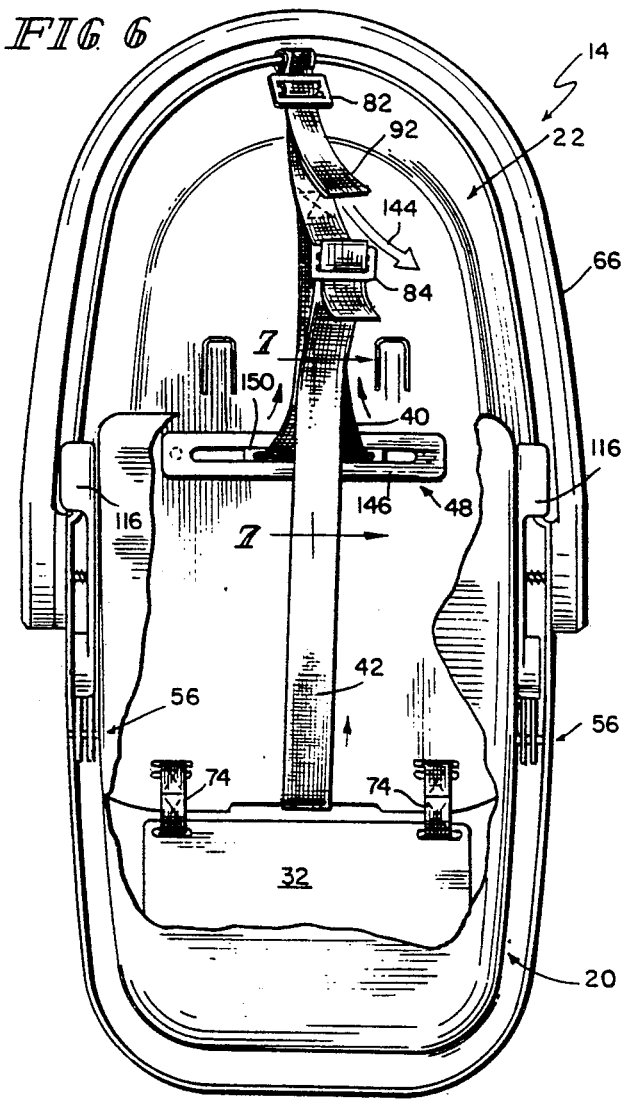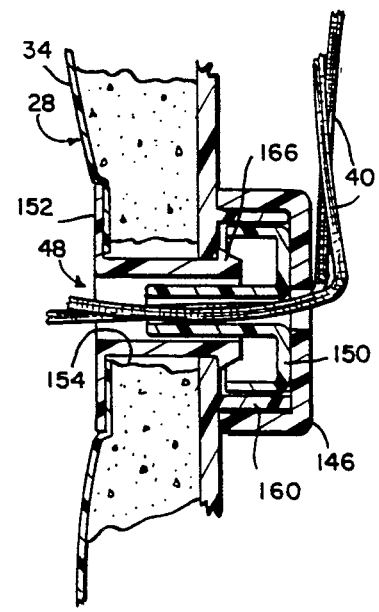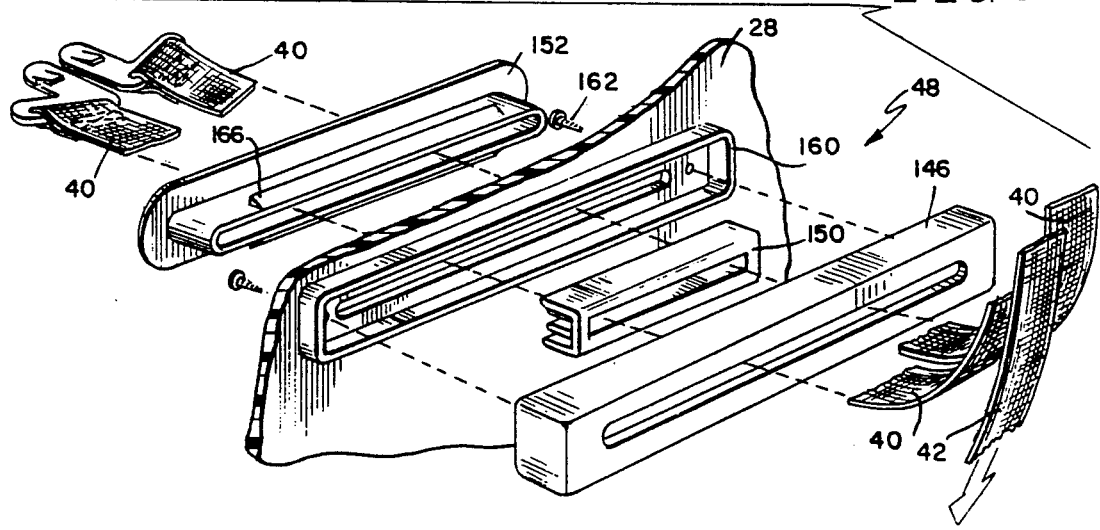

CONVERTIBLE INFANT RESTRAINT DEVICE

This is a continuation of application Ser. No. 256,040 filed Oct. 11, 1988 now U.S. Pat. No. 4,998,307.

BACKGROUND AND SUMMARY OF THE INVENTION

The present invention relates to infant vehicle restraint devices. More particularly, the present invention relates to an infant restraint device which can be used both as an infant car bed and as a standard rear-facing infant seat, with the device easily convertible between the two configurations.

It has been recognized for some period of time that it is desirable, and in some instances necessary, to transport small infants in a prone position in a motor vehicle. In such instances, it is of utmost importance to be able to secure the infant adequately within the motor vehicle. The ability to transport small infants in a motor vehicle safely is desirable for several reasons. First, most healthy newborn infants under a certain age are much more comfortable and more easily transported in a position in which they can sleep in the supine position. Most conventional car seats are not designed to support very young infants while they are sleeping, at least not in a comfortable position. Second, for premature or low birth weight infants, it is not only desirable, but often mandatory to transport such infants in a supine position. Additionally, certain medically fragile infants must also be transported in a supine or prone position, not only for the comfort of the infant but also to avoid any complications with any of the medical problems of the infant. Finally, infants with certain breathing disorders, such as apnea, need to be transported in a prone position to ensure that they can breathe adequately.

It would be advantageous to provide an infant car bed which could be used for all of the types of infants described above, but which could be converted into a standard rear-facing infant seat when the infant grows beyond a weight of approximately 14 pounds. Such a convertible infant restraint device could then be used for a long period of time and thus, the demand for such a device would be increased.

Thus, one object of the present invention is to provide an infant restraint device that can be used as a car bed that is designed to adequately protect infants, even medically fragile infants, in the event of a collision, with the device being convertible to a rear-facing infant seat for older infants.

Another object of the present invention is to provide an infant restraint device which includes an assembly within the device to secure the infant within the device both while the device is being utilized as a bed and as a rear-facing seat.

Yet another object of the present invention is to provide an infant restraint device in which the securing assembly permits controlled lateral movement of the infant within the device while preventing movement of the infant which could cause the infant to be thrown from the device. Such controlled lateral movement, in cooperation with side restraints on the device, increases the crashworthiness and protective capabilities of the device.

According to the present invention, an infant restraint device for use in a motor vehicle is provided. The device includes a generally rigid shell assembly for receiving an infant, with the shell assembly having a lower shell portion and an upper shell portion. Means are provided for pivotally coupling the lower shell portion to the upper portion to permit the shell assembly to be alternately positioned in either a substantially planar configuration or in an angled configuration.

One feature of the foregoing structure is that the restraint device includes a generally rigid shell which has an upper and lower portion that are pivotally coupled so that the shell can be positioned in either a planar configuration or an angled configuration. One advantage of the foregoing structure is such that the restraint device can be utilized as both a car bed for small infants and as a standard rear-facing restraint device for older infants.

In preferred embodiments of the present invention, the coupling means for coupling the lower shell portion to the upper shell portion includes locking means for selectively locking the shell assembly in either the planar configuration or the angled configuration. One feature of the foregoing structure is that a lock is provided for retaining the two shell portions in either the planar configuration or the angled configuration.

Also in preferred embodiments of the present invention, the device includes means for controllably securing the infant within the device. The securing means includes a harness arrangement that includes upper shoulder straps and a lower strap, with guiding means being provided for receiving the upper shoulder straps and the lower strap to permit controlled movement of the straps in a lateral direction. One feature of the foregoing structure is that the securing means within the device provides for controlled lateral movement of the infant during a collision or other abnormal condition of the vehicle. One advantage of the foregoing structure is that, by providing for controlled lateral movement of the infant, the side portions of the device cooperate with the harness arrangement to cushion and dissipate any forces imposed on the infant, thereby increasing the crash protection and protective capabilities of the device.

Thus, the present invention provides an infant restraint device which can be used as a protective car bed for transporting small infants under a certain weight, and for transporting various types of medically fragile infants. Additionally, the device can be easily converted to a conventional rear-facing car seat for use with the infant after the infant has grown beyond the specified weight during which the car bed configuration can be used. By providing an infant restraint device which is convertible between a car bed and a rear-facing seat, such a device can be used for a much longer period of time.

Additionally objects, features, and advantages of the invention will become apparent to those skilled in the art upon consideration of the following detailed description of a preferred embodiment exemplifying the best mode of carrying out the invention as presently perceived. The detailed description particularly refers to the accompanying figures in which:

BRIEF DESCRIPTION OF THE DRAWINGS

FIG. 6 is a bottom view of FIG. 1 with portions broken away illustrating the harness assembly and its adjustment features;

FIG. 7 is a sectional view taken along lines 7—7 of FIG. 6 illustrating the harness slide assembly, and;

FIG. 8 is an exploded perspective view of the harness slide assembly.

DETAILED DESCRIPTION OF THE DRAWINGS

Figure 1:
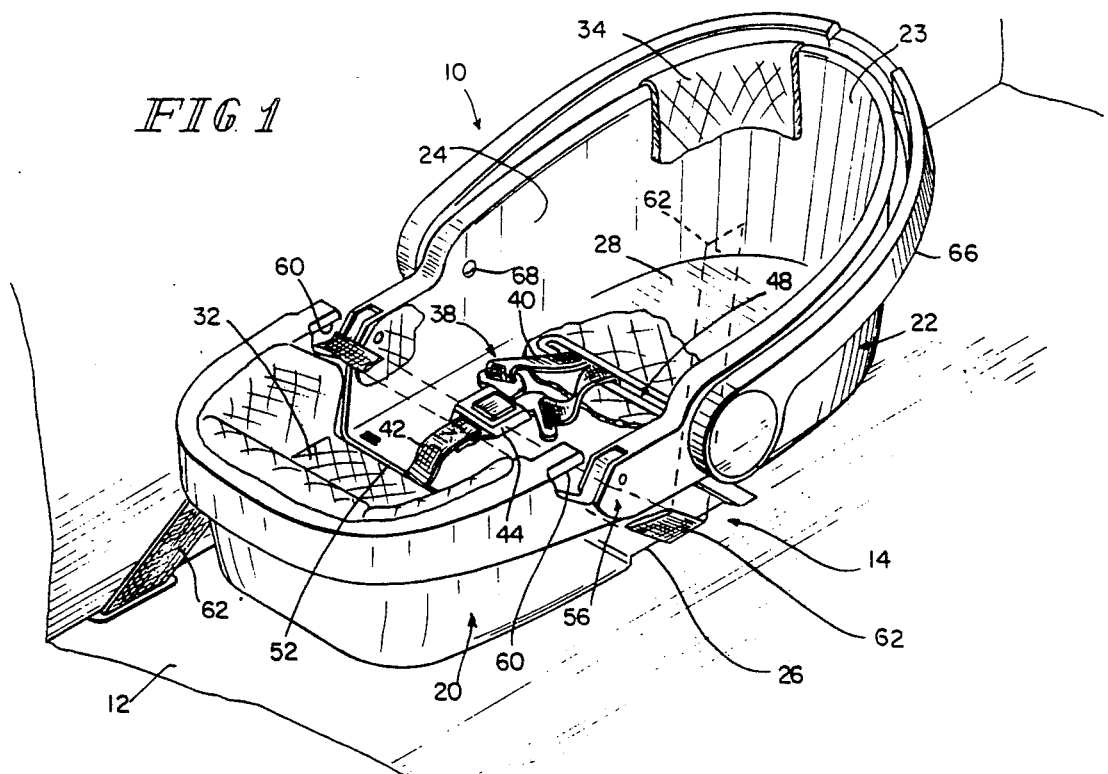
FIG. 1 is a perspective view of the convertible infant restraint device positioned in the car bed orientation and shown placed in the rear seat of a motor vehicle.
Figure 2:
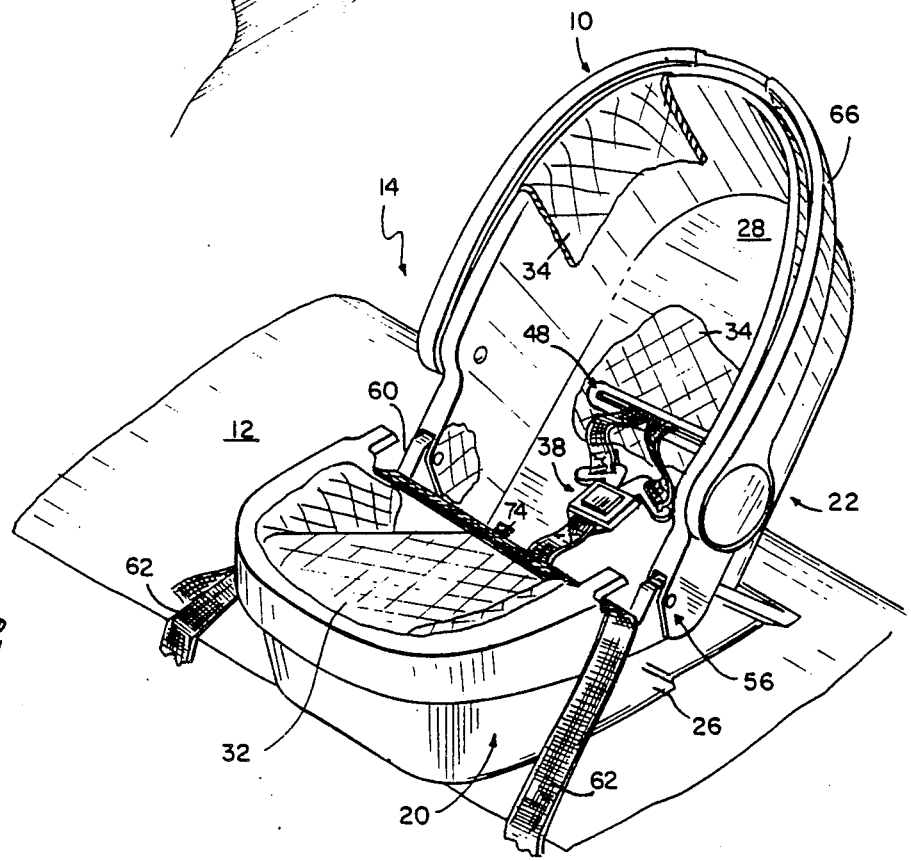
FIG. 2 is a perspective view of the present invention in the rear-facing car seat orientation.

Referring now to the drawings, FIG. 1 shows a convertible infant restraint device 10 according to the present invention. The device 10 is capable of being utilized both as a car bed which is illustrated in FIG. 1, and as a standard rear-facing car seat which is illustrated in FIG. 2. FIG. 1 shows the device 10 mounted on an outboard passenger motor vehicle seat 12, with the head portion of the device 10 oriented toward the center of the motor vehicle.

The device 10 includes a generally rigid shell assembly 14 which includes a lower shell portion 20 and an upper shell portion 22. The upper shell portion 22 is configured to receive an upper portion of an infant (not shown), while the lower shell portion 20 is configured to receive the lower portion of the infant. The lower shell portion 20 and upper shell portion 22 are pivotable with respect to each other to permit the shell assembly 14 to be oriented in either a generally planar configuration as shown in FIG. 1, or an angled configuration as shown in FIG. 2. The pivoting mechanism will be described below in the discussion related to FIGS. 4 and 5.

The upper shell portion 22 includes a head portion 23 with depending side wall portions 24. As illustrated in FIG. 1, the side wall portions 24 increase in height toward the head portion 23. This increase in height of the side wall portions 24 toward the head portion 23 provides additional protective characteristics for the infant, and particularly for the infant's head area. The lower shell portion 20 includes a base portion 26 which serves as a support for the device 10.

An upper support surface 28 is included in the upper shell portion 22 which cooperates with a lower support surface 32 which is provided in the lower shell portion 20 to support the infant. The upper support surface 28 and lower support surface 32 cooperate to support the infant both in the planar configuration as shown in FIG. 1, and in the angled configuration as shown in FIG. 2. The lower support surface 32 changes in configuration between the planar configuration and the angled configuration in response to the necessity of providing a seat portion for the infant when in the angled configuration. This change in configuration of the lower support surface 32 will be described below in the discussion related to FIGS. 3 and 4. Illustratively, in the preferred embodiment, a padded cover 34 is provided which covers the inside of the shell assembly 14 to provide comfort and additional protection for the infant.

A harness assembly 38 is provided for securing the infant within the shell assembly 14. The harness assembly 38 includes two shoulder straps 40 and a lower crotch strap 42 which terminates in a harness buckle 44. The two shoulder straps 40 lock into the harness buckle 44 in a conventional manner and cooperate with the lower strap 42 to secure the infant within the shell assembly 14 when the shell assembly 14 is in both the planar configuration (FIG. 1) and the angled configuration (FIG. 2). Because of unique characteristics with the harness assembly 38 which will be discussed below in the discussion related to FIGS. 4 and 6, no adjustment of the harness assembly 38 is necessary when the shell assembly 14 is converted between the planar configuration and the angled configuration. This is advantageous because, with the infant in place and securely strapped in the planar configuration, the shell assembly 14 can be converted to the angled configuration as shown in FIG. 2 without any adjustment of the harness assembly 38 or any repositioning of the infant required.

It has been found that it is desirable to allow the infant to controllably slide toward one of the two side wall portions 24 when exposed to lateral deceleration forces. By permitting the infant to slide controllably toward one of the side wall portions 24, such lateral deceleration forces can be dissipated against the side wall portion 24 and the padded cover 34 to protect the infant, and to prevent the infant from being injured by the harness assembly 38. Under lateral deceleration forces, it is possible for an infant's shoulders to actually roll out from under the shoulder straps 40 if the harness assembly 38 does not permit such sliding movement toward the side wall portions 24. The harness assembly 38 includes a sliding arrangement to permit such lateral sliding movements under lateral deceleration forces. An upper strap slot assembly 48 is provided in the upper support surface 28 to permit the shoulder straps 40 to move laterally. Additionally, a lower strap slide 52 is provided to permit the lower strap 42 to move laterally. By providing the upper strap slot assembly 48 and the lower strap slide 52, the harness assembly 38 and occupant are permitted to move laterally toward one of the two side wall portions 24 under lateral deceleration forces. However, the harness assembly 38 is configured to prevent any outward movement of the infant away from the shell assembly 14. Thus, the infant is restrained against outward movement away from the shell assembly 14 by the harness assembly 38, however limited lateral movement of the infant is permitted by the sliding feature of the harness assembly 38. More specific details to the structure of the sliding harness assembly 38 will be described below in the discussion related to FIGS. 6-8.

A pivot arrangement 56 is provided to pivotally attach the upper shell portion 22 to the lower shell portion 20. This pivot arrangement 56 permits the upper shell portion 22 to be pivoted away from the generally planar configuration shown in FIG. 1 to the angled configuration shown in FIG. 2. Again, by permitting the upper shell portion 22 to be pivoted away from the planar configuration shown in FIG. 1, the shell assembly 14 can be positioned to an angled orientation as shown in FIG. 2 to permit the device 10 to be used as a standard rear-facing car seat for infants once the infant has grown beyond the size where the car bed configuration (FIG. 1) can be used safely. Illustratively, it has been found that the device 10 can be utilized in the car bed configuration as illustrated in FIG. 1 for infants from birth up to approximately 12-14 pounds in weight. Additionally, the device 10 can be used in the car bed configuration for low birth weight infants who weigh as little as 4¾ pounds. The device 10 can be utilized in the angled configuration illustrated in FIG. 2 as a standard rear-facing car seat for infants up to 20 pounds in weight.

Recesses 60 are provided in the lower shell portion 20 to receive a standard vehicle seat belt 62. As shown in FIG. 1, the proper positioning of the device 10 when in a car bed configuration is with the head portion 23 of the shell assembly 14 oriented toward the center of the motor vehicle (not shown). The vehicle seat belt 62 is then routed through the recess 60 closest to the seat back, across the lower portion of the infant, through the opposite recess 60, and then beneath the lower shell portion 20 and upper shell portion 22 and then attached in a normal manner to the opposite end of the seat belt 62. In this position, the infant's head is located near the center of the motor vehicle, which has been found to be the safest location for crash protection.

A curved handle 66 is provided which pivots on pins 68 located in the upper shell portion 22. The handle 66 is adjustably moveable to act as either a carrying handle or as a rocking support for the shell assembly 14, if desired. The mechanism for adjustably moving the handle 66 will be discussed later in the discussion related to FIG. 4. In general, it will be understood that the handle 66 can be oriented upwardly to serve as a handle to carry the shell assembly 14 when in both the car bed configuration and the angled seat configuration. If the handle 66 is moved downwardly from the position illustrated in FIG. 1, it can serve as a curved base to partially support the shell assembly 14. By functioning as a curved base, the shell assembly 14 can be rocked from side to side, both in the configuration illustrated in FIG. 1 and in the configuration illustrated in FIG. 2.

FIG. 2 shows the convertible infant restraint device 10 configured as a standard rear-facing car seat. Specifically, the upper shell portion 22 has been pivoted about the pivot arrangement 56 to form the angled orientation shown in FIG. 2. The details of the pivot arrangement will be discussed later in the discussion related to FIG. 5. In the angled configuration shown in FIG. 2, the base portion 26 of the lower shell portion 20 serves as a support for the entire shell assembly 14. As discussed above, the harness assembly 38 functions to properly restrain the infant from movement away from the shell assembly 14, but permits lateral movement when the infant is exposed to lateral deceleration forces without any adjustment from the configuration shown in FIG. 1. The device 10 is secured to the motor vehicle seat 12 by routing the seat belt 62 through the two recesses 60 in a conventional manner. In the preferred embodiment, the device 10 must only be used as a rear-facing seat when in the angled configuration. As can be seen, the lower support surface 32 is angled somewhat to serve as a seat for the infant in the angled configuration. The change in configuration and placement of the lower support surface 32 between the configuration illustrated in FIG. 1 and the configuration illustrated in FIG. 2 occurs automatically upon pivoting of the upper shell portion 22. This reorientation of the lower support surface 32 upon movement of the upper shell portion 22 will be discussed below in the discussion related to FIGS. 3 and 4. Again, in the angled configuration, the device 10 can be utilized with infants up to a weight of approximately 20 pounds.

Figure 3:
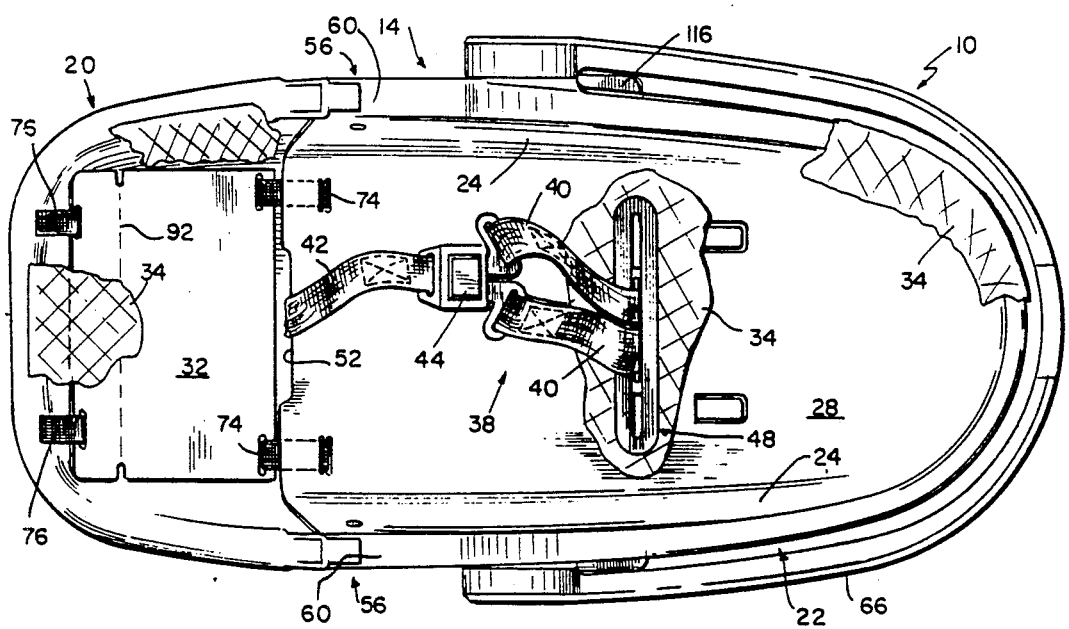
FIG. 3 is a top plan view of FIG. 1 with portions of the cover removed for clarity.

FIG. 3 shows in greater detail the arrangement of the harness assembly 38, and also the structure of the lower support surface 32, and its connection to the upper support surface 28. Specifically, the lower support surface 32 is flexibly coupled to the upper support surface 28 by flexible straps 74. The bottom end of the lower support surface 32 is attached to the lower shell portion 20 by flexible straps 76. A space is created between the lower support surface 32 and the upper support surface 28 to form the lower strap slide area 52.

Figure 4:
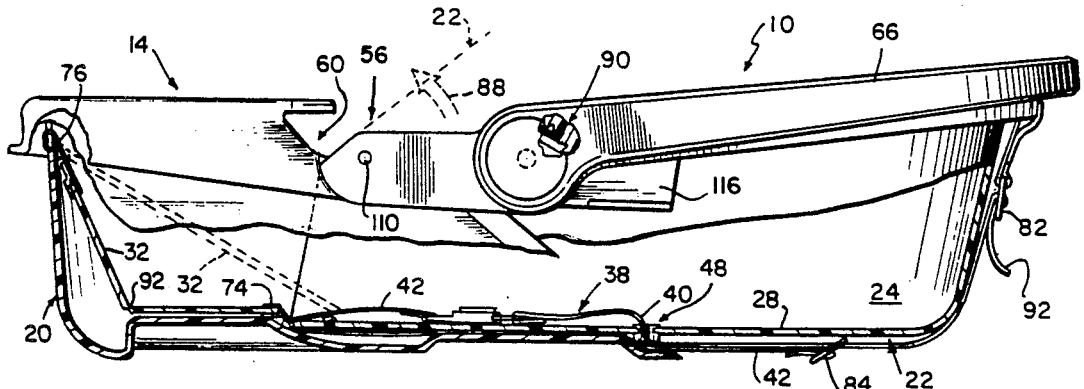
FIG. 4 is a side elevational view of FIG. 3 with the lower portion broken away.

FIG. 4 illustrates the routing and configuration of the harness assembly 38, and also illustrates in dotted line the repositioning of the lower support surface 32 when the upper shell portion 28 is moved to the angled orientation to form the standard rear-facing seat assembly. Specifically, when the upper shell portion 22 is rotated in the direction of arrow 88, the upper support surface 28 moves the lower support surface 32 through the flexible straps 74 to the orientation illustrated in dotted line. In this configuration, the lower support surface 32 forms a seat area for the infant which is necessary when the device 10 is in the angled orientation. When the device 10 is in the planar configuration illustrated in FIG. 4 in solid line, the lower support surface 32 is an angled member, with the angle created by a flexible portion 92 formed in the lower support surface 32. When the upper shell portion 22 is rotated in the direction of arrow 88 to the angled orientation illustrated in FIG. 2, the upper support surface 28 pulls the lower support surface 32 to a straight orientation by the straps 74 because of the movement of the upper support surface 28 away from the lower shell portion 20. When the upper shell portion 22 is locked in the angled orientation, the lower support surface 32 will be held in the straight orientation as shown in dotted line to form the seat for the infant.

The harness assembly 38 is a single adjustment arrangement which provides for easy adjustment of the assembly 38 by simply adjusting the length of the shoulder straps 40 by the use of a combined adjustment buckle 82. The lower strap 42 is attached to the shoulder straps 40 in a piggy-back arrangement and thus moves in unison with the shoulder straps 40. The position of the lower strap 42 with respect to the shoulder straps 40 can be adjusted using a lower strap adjustment buckle 84. Thus, when the infant is placed in the shell assembly 14, the first adjustment is the proper placement of the lower strap 42, and particularly the proper location of the harness buckle 44. This adjustment is made by adjusting the length of the lower strap 42 using the lower strap adjustment buckle 84. Once this adjustment has been probably made, the overall tightness of the harness assembly 38 is adjusted by lengthening or shortening the shoulder straps 40 using the combined adjustment buckle 82. As can be seen in FIG. 4, tightening the shoulder straps 40 using the combined adjustment buckle 82 will also tighten the lower strap 42 simultaneously. Conversely, loosening the shoulder straps 40 through the combined adjustment buckle 82 will simultaneously loosen the lower strap 42. Thus, accurate adjustments of the harness assembly 38 can be made to both the lower strap 42 and the shoulder straps 40 simultaneously, which greatly simplifies the adjustment of the harness assembly 38 to the proper configuration to properly restrain the infant within the shell assembly 14. FIG. 4 also shows the attachment of the handle 66 to the upper shell portion 22. Specifically, the handle 66 is attached to the upper shell portion 22 by a tooth arrangement 90 which permits selective angular adjustment of the handle 66 to any desired position.

Figure 5:
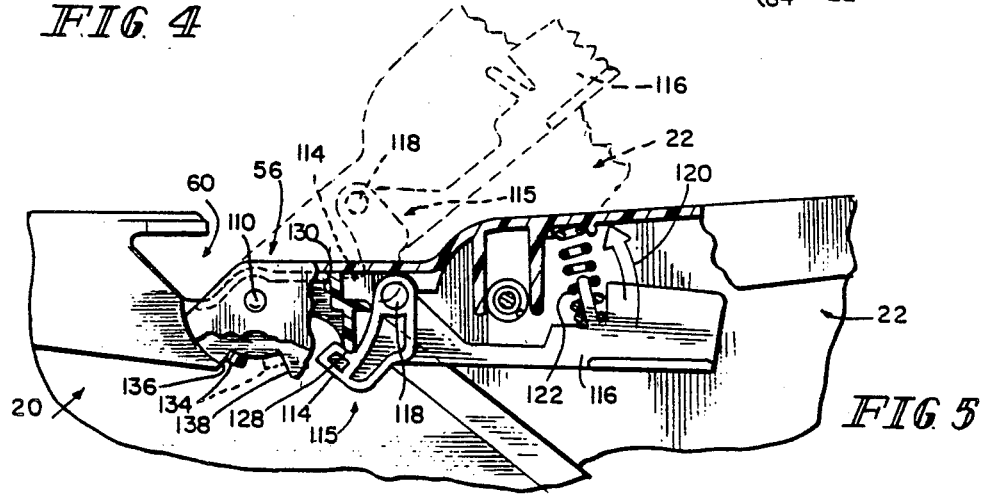
FIG. 5 is an enlarged portion of FIG. 4 with portions broken away to illustrate the structure of the latch assembly.

FIG. 5 illustrates the locking mechanism 115 for locking the upper shell portion 22 in one of the two orientations with respect to the lower shell portion 20.

The pivot arrangement 56 includes a pivot pin 110 about which the upper shell portion 22 pivots with respect to the lower shell portion 20. A locking pawl 114 is provided which is attached to a lever arm 116 to lock the upper shell portion 22 in a either the planar configuration (shown in solid lines) or the angled configuration (shown in dotted lines). The lever 116 pivots about a pivot 118 and is moveable in the direction of arrow 120 against a resilient spring force provided by a spring 122. Thus, the spring 122 acts to keep the lever 116 in its lower position as illustrated in FIG. 5. With the upper shell portion 22 in its lowered position to form the planar configuration of the shell assembly 14, the locking pawl 114 cooperates with a downwardly extending finger 128 to lock the upper shell portion 22 in this planar configuration. The biasing force provided by the spring 122 acts to maintain the pawl 114 in the locked position.

To rotate the upper shell portion 22 upwardly toward the angled orientation, the operator first squeezes the lever 116 in the direction of arrow 120 against the resilient force of the spring 122. This unlocks the locking pawl 114 from the downwardly extending finger 128. The upper shell portion 22 is then manually moved upwardly toward the angled position illustrated in dotted line. When the upper shell portion 22 reaches the proper position, the lever 116 is released, and the locking pawl 114 is forced into a locking notch 130 which is formed in the lower shell portion 20 above the downwardly extending finger 128. The spring 122 acts to both force the locking pawl 114 into the notch 130, and to retain the pawl 114 in the notch 130 after the lever 116 has been released.

To ensure that the upper shell portion 22 is not rotated beyond its proper angled position as shown in dotted line, an outwardly extending arm 134 is provided which is attached to the upper shell portion 22 and which travels between a first shoulder 136 and a second shoulder 138. With the arm 134 butted against the first shoulder 136, any further downward movement of the upper shell portion 22 is prevented. As the upper shell portion 22 is rotated toward the angled orientation illustrated in dotted line, the movement is limited by the position of the second shoulder 138. Specifically, the second shoulder 138 acts to limit the movement of the arm 134 such that any further upward movement of the upper shell portion 22 beyond the desired position is prevented. The position of the arm 134 when the upper shell portion 22 is rotated to the proper angled orientation is shown in dotted line. It will be understood that, although only one locking mechanism 115 is shown in FIG. 5, in the preferred embodiment there are two locking mechanisms 115, one on either side of the shell assembly 14.

FIG. 6 shows in greater detail the arrangement of the harness assembly 38 and its adjustment features, and also shows further details of the sliding features of the harness assembly 38. As discussed above, the harness assembly 38 includes a single strap adjustment feature which permits adjustment of both of the lower strap 42 and the shoulder straps 40 by a single adjustment, with both the lower strap 42 and shoulder straps 40 being moved simultaneously. Specifically, as the shoulder straps 40 are shortened by pulling on the end 92 in the direction of arrow 144, both the shoulder straps 40 and the lower strap 42 are shortened. Again, this single adjustment features provides for easy adjustment of the harness assembly 38 after the infant has been placed in the shell assembly 14. To permit the shoulder straps 40 to move laterally, a back plate 146 is attached to the underneath side of the upper support surface 28. The slot 48 is formed by this back plate 146. The function of the back plate 146 will be discussed in greater detail below in the discussion related to FIGS. 7 and 8.

FIGS. 7 shows in greater detail the attachment of the back plate 146 to the upper support surface 28, and the routing of the shoulder straps 40 through the slot assembly 48. A movable strap slide 150 is provided through which the shoulder straps 40 are routed and retained. The strap slide 150 is captured for movement between the back plate 146 and a track 160 which is formed as a part of the underneath side of the upper support surface 28. The strap slide 150 permits the shoulder straps 40 to move laterally, while still maintaining the proper placement of the shoulder straps 40 around the infant. It will be understood that, in the absence of the strap slide 150, the shoulder straps 40 could become tangled or otherwise misaligned while moving in the slot assembly 48. A front locking plate 152 is provided which is placed in a hole 154 in the upper support surface 28 and which engages the track 160. Thus, the front locking plate 152, the track 160, and the strap slide 150 cooperate to form the slot assembly 48. The front locking plate 152 includes elongated, spaced-apart projections which terminate in locking ribs 166. These locking ribs 166 snap into place in the track 160 after the front locking plate 152 has been inserted through the hole 154. The locking ribs 166 thus act to both properly position the front locking plate 152, and to retain the locking plate 152 in the proper position and orientation.

FIG. 8 shows in still greater detail the orientation of the front locking plate 152, the track 160, the strap slide 150, and the back plate 146. FIG. 8 shows that the back plate 146 is attached to the upper support surface 28 by screws 162. The strap slide 150 is captured between the track 160 and the back plate 146. After the back plate 146 has been attached to the upper support surface 28 by the screws 162, the front locking plate 152 is inserted through the hole 154, with the locking ribs 166 engaging the track 160 to properly position the front locking plate 152. With the shoulder straps 40 routed through the back plate 146, the strap slide 150, the track 160, and the front locking plate 152, controlled lateral movement of the shoulder straps 40 upon lateral deceleration forces is permitted.

Thus, the present invention provides an infant restraint device which functions both as an infant car bed for infants under approximately 14 pounds in weight, and for medically fragile infants, and which also converts to a standard rear-facing car seat for older infants. The device includes a floating or moving restraint system which cooperates with the sides of the device to dissipate lateral deceleration forces which might be imposed upon the infant. By permitting the device to be converted from an infant car bed to a standard rear-facing seat, the device can be used for a much longer period of time than a conventional car bed. Further, with the handle 66, the device can be used as carrier for transporting the child outside the vehicle.

Although the invention has been described in detail with reference to a preferred embodiment and specific examples, variations and modifications exist within the scope and spirit of the invention as defined in the following claims.

What is claimed is:

1. A convertible infant restraint device comprising a shell assembly including lower and upper shell portions, the lower shell portion including first and second fingers formed as a unitary piece of material with said lower shell portion, means for pivotably connecting the upper shell portion to the lower shell portion for movement between a first position in which the lower and upper shell portions are aligned in longitudinally extending end-to-end relation to provide a flat bed and a second position in which the lower and upper shell portions are aligned at an angled to one another to provide a chair, and means for selectively locking the lower and upper shells together in one of the first and second positions, the locking means including lever means for engaging the first finger of the lower shell portion to establish the first position and the second finger of the lower shell portion to establish the second position.

2. The device of claim 1, wherein the locking means further includes spring means coupled to the upper shell portion for applying a biasing force to retain the lever means in engagement with one of said first and second fingers rigidly fixed to the lower shell portion.

3. The device of claim 2, wherein the lever means includes a handle having a proximal end pivotably connected to the upper shell portion and a distal end, and a locking pawl appended to the proximal end, and the spring means acts between the upper shell portion and the distal end of the handle to retain the locking pawl in engagement with one of said first and second fingers rigidly fixed to the lower shell portion.

4. A convertible infant restraint device comprising
a shell assembly including lower and upper shell portions, the lower shell portion including first and second fingers rigidly fixed thereto, means for pivotably connecting the upper shell portion to the lower shell portion for movement between a first position in which the lower and upper shell portions are aligned in longitudinally extending end-to-end relation to provide a flat bed and a second position in which the lower and upper shell portions are aligned at an angle to one another to provide a chair, means for selectively locking the lower and upper shells together in one of the first and second positions, the locking means including lever means for engaging the first finger of the lower shell portion to establish the first position and the second finger of the lower shell portion to establish the second position, and a foldable member having one end coupled to the lower shell portion and another end coupled to the upper shell portion, the foldable member being movable from a folded position providing one end of the flat bed to an unfolded position providing a chair seat in response to movement of the upper shell portion relative to the lower shell portion to the second position.

5. The device of claim 4, wherein the foldable member includes a first section having proximal and distal ends, a second section having proximal and distal ends, joint means for pivotably connecting the proximal ends of the first and second sections together to permit relative movement of the first and second sections, first means for coupling the distal end of the first section to the lower shell portion to permit relative movement therebetween, and second means for coupling the distal end of the second section to the upper shell portion to permit relative movement therebetween so that the first and second sections pivot with respect to one another about the joint means in response to movement of the upper shell portion relative to the lower shell portion.

6. A convertible infant restraint device comprising
a shell assembly including lower and upper shell portions, the lower shell portion including first and second fingers rigidly fixed thereto, the lower and upper shell portions cooperating to define a lower strap slot therebetween, the upper shell portion being formed to include an upper strap slot, and further comprising harness means for securing an infant in the shell assembly, the harness means including a lower strap extending through the lower strap slot to position a first end of the lower strap inside the shell assembly and a second end of the lower strap outside the shell assembly, a shoulder strap assembly extending through the upper strap slot to position a first end of the shoulder strap assembly inside the shell assembly and a second end of the shoulder strap assembly outside the shell assembly, means disposed inside of the shell assembly for interconnecting the first end of the lower strap and the first end shoulder strap assembly, and the second end of the lower strap being coupled to the second end of the shoulder strap assembly outside the shell assembly, means situated outside of the shell assembly for adjustably coupling the second end of the lower strap and the second end of the shoulder strap assembly to the upper shell portion, means for pivotably connecting the upper shell portion to the lower shell portion for movement between a first position in which the lower and upper shell portions are aligned in longitudinally extending end-to-end relation to provide a flat bed and a second position in which the lower and upper shell portions are aligned at an angle to one another to provide a chair, and means for selectively locking the lower and upper shells together in one of the first and second positions, the locking means including lever means for engaging the first finger of the lower shell portion to establish the first position and the second finger of the lower shell portion to establish the second position.

7. A convertible infant restraint device comprising
a shell assembly including an upper shell portion for supporting an upper portion of an infant and a lower shell portion for supporting a lower portion of an infant, means for pivotably attaching the upper shell portion to the lower shell portion to permit the upper shell portion to be alternately positioned in a first generally planar orientation and in a second angular orientation relative to the lower shell portion, and means for locking the upper shell portion to the lower shell portion in a selected one of the planar orientation and the angular orientation, the locking means including a lever arm pivotally attached to the upper shell portion, a locking pawl coupled to the lever arm, and engaging means formed of a unitary piece of material with the lower shell portion for engaging the locking pawl in one of a first position to lock the upper and lower shell portions in the generally planar orientation and a second position to lock the upper and lower shell portions in the angular orientation, respectively.

8. The device of claim 7, wherein the engaging means includes a locking member integrally formed on the lower shell portion, the locking member formed to include a downwardly extending finger engaging the locking pawl in the first position and a lock notch engaging the locking pawl in the second position.

9. The device of claim 8, further comprising means coupled to the upper shell portion for biasing the lever arm against the locking member to maintain contact between the locking pawl and the downwardly extending finger when the upper and lower shell portions are in the generally planar orientation and to maintain contact between the locking pawl and the lock notch when the upper and lower shell portions are in the angular orientation.

10. The device of claim 7, further comprising stop means on the lower shell portion for engaging the upper shell portion to limit pivotal movement of the upper shell portion relative to the lower shell portion to a predetermined range of angular positions between the planar orientation and the angular orientation.

11. The device of claim 10, wherein the stop means includes first and second shoulders formed on the lower shell portion and an arm member formed on the upper shell portion and situated to lie between the first and second shoulders, the arm member moving between a first position abutting the first shoulder when the upper shell portion is situated in the generally planar orientation and a second position abutting the second shoulder when the upper shell portion is situated in the angular orientation.

12. The device of claim 7, further comprising a harness assembly including a lower strap and first and second shoulder straps for securing the infant within the shell assembly, and means for coupling the lower strap and the first and second shoulder straps together so that the shell assembly can be moved from the planar orientation to the angular orientation with the infant secured by the harness assembly without adjusting the harness assembly.

13. An infant restraint device for securing and supporting an infant, the device comprising a generally rigid shell assembly including an interior portion configured to receive an infant, the shell assembly including an upper shell portion, a lower shell portion, and means for pivotably connecting the upper shell portion to the lower shell portion to permit movement of the upper shell portion relative to the lower shell portion between a first generally planar orientation and a second angular orientation, the shell assembly being formed to include a first aperture and at least one second aperture, a lower strap positioned between the infant's legs to support the infant, the lower strap extending through the first aperture formed in the shell assembly, a first end portion of the lower strap being disposed in the interior portion of the shell assembly and a second end portion of the lower strap being configured to lie outside the interior portion of the shell assembly, first and second shoulder straps extending through the at least one second aperture formed in the shell assembly so that first ends of the first and second shoulder straps lie in the interior portion of the shell assembly and second ends of the first and second shoulder straps lie outside the interior portion of the shell assembly, the second ends of the first and second shoulder straps being coupled to the second portion of the lower strap outside the interior portion of the shell assembly, means for coupling the first end portion of the lower strap to the first ends of the first and second shoulder straps together in the interior portion of the shell assembly to secure the infant within the interior portion, and an adjustment strap for coupling the second end of the lower strap and the second ends of the first and second shoulder straps to the shell assembly wherein the second ends of the shoulder straps are attached directly to the adjustment strap, and an adjustment buckle for slidably receiving said adjustment strap and for retaining said adjustment strap in a selected position to adjust the length of the lower strap and the length of the first and second shoulder straps simultaneously regardless of the orientation of the upper shell portion relative to the lower shell portion to facilitate adjustment of the shoulder straps and the lower strap after the infant has been placed in the interior of the shell assembly and secured in position by the lower strap and the first and second shoulder straps.

14. The device of claim 13, wherein the shell assembly includes an upper shell portion and a lower shell portion, and means for pivotably coupling the upper shell portion to the lower shell portion to permit movement of the upper shell portion relative to the lower shell portion between a first generally planar orientation and a second angular orientation.

15. The device of claim 14, further comprising a foldable support member including an upper portion and a lower portion appended to the upper portion along and edge thereof, and means for coupling the foldable support member to the shell assembly so that the upper and lower portions of the support member fold along the edge in response to movement of the upper and lower shell portions from the second angular orientation to the first generally planar orientation.

16. A restraint device for securing and supporting an infant, the device comprising a shell assembly formed to include a chamber sized to receive the infant, the shell assembly including an upper shell portion having a bottom surface and a side wall extending upwardly from the bottom surface to define a closed end forming an upper boundary of the chamber and an open end spaced apart from the closed end, the shell assembly also including a lower shell portion having a bottom surface and a side wall extending upwardly from the bottom surface to define a closed end forming a lower boundary of the chamber and an open end spaced apart from the closed end, the open end of the upper shell portion being nested within the open end of the lower shell portion so that a portion of the side wall of the lower shell portion overlaps a portion of the side wall of the upper shell portion to form the shell assembly, the side walls of the upper and lower shell portions including a top edge defining an opening into the chamber, and means for pivotably coupling the upper shell portion to the lower shell portion to permit movement of the upper shell portion relative to the lower shell portion between a first generally planar orientation and a second angular orientation the coupling means being located near the top edge of the side walls so that the open end of the upper shell portion moves away from the closed end of the lower shell portion and closer to the open end of the lower shell as the upper and lower shell portions are pivoted from the generally planar orientation to the angular orientation.

17. The device of claim 16, further comprising a foldable support member including an upper portion and a lower portion appended to the upper portion along an edge thereof, and means for coupling the foldable support member to the shell assembly so that the upper and lower portions of the support member fold along the edge in response to movement of the upper and lower shell portions from the second angular orientation to the first generally planar orientation.

18. The device of claim 17, further comprising means for securing the infant to the upper shell portion, the securing means being configured to operate independently of movement of the foldable support member.

19. The device of claim 18, wherein the securing means includes a harness assembly having a lower strap and first and second shoulder straps for securing the infant within the shell assembly, and means for coupling the lower strap and the first and second shoulder straps together so that the shell assembly can be moved from the planar orientation to the angular orientation with the infant secured by the harness assembly without adjusting the harness assembly.

20. The device of claim 16, further comprising first and second fingers rigidly fixed to the lower shell portion and means for selectively locking the lower and upper shell portions together in one of the first and second orientations, the locking means including lever means for engaging the first finger of the lower shell portion to establish the first position and the second finger of the lower shell portion to establish the second position.

21. A restraint device for securing and supporting an infant, the device comprising
    an upper shell portion,
    a lower shell portion,
    means for pivotably connecting the upper shell portion to the lower shell portion to permit movement of the upper shell portion relative to the lower shell portion between a first generally planar orientation and a second angular orientation, the connected upper and lower shell portions defining a chamber sized to receive the infant,
    means for supporting a lower portion of the infant, the supporting means including a lower support surface situated inside the chamber and adjacent to the lower shell portion, the lower support surface including a flexible portion, and
    means for coupling the lower support surface to the lower shell portion and to the upper shell portion to provide a generally planar seat for the infant when the upper and lower shell portions are in the second angular orientation, the lower support surface bending along the flexible portion from a planer alignment to a angular alignment in response to movement of the upper shell portion relative to the lower shell portion from the second angular orientation to the first generally planar orientation.

22. The device of claim 21, further comprising means for securing the infant to the upper shell portion, the securing means contacting only the upper shell portion so that the securing means operates independently of movement of the upper shell portion relative to the lower shell portion.

23. The device of claim 21, further comprising means for selectively locking the lower and upper shell portions together in one of the first and second orientations, the locking means including lever means for engaging a first portion of the lower shell portion to establish the first orientation and a second portion of the lower shell portion to establish the second orientation.

24. The device of claim 23, wherein the locking means further includes spring means coupled to the upper shell portion for applying a biasing force to retain the lever means in engagement with one of said first and second portions of the lower shell portion.

25. The device of claim 24, wherein the lever means includes a handle having a proximal end pivotably connected to the upper shell portion and a distal end, and a locking pawl appended to the proximal end, and the spring means acts between the upper shell portion and the distal end of the handle to retain the locking pawl in engagement with one of said first and second portions of the lower shell portion.

26. The device of claim 25, wherein the lower shell portion includes an appendage in close proximity to the connecting means, the appendage is formed to include a finger providing said first portion of the lower shell portion and a notch configured to receive the locking pawl to provide said second portion of the lower shell.

27. The device of claim 21, wherein the lower and upper shell portions cooperate to define a lower strap slot therebetween, the upper shell portion is formed to include at least one upper strap slot, and further comprising harness means for securing an infant in the shell assembly, the harness means including a lower strap extending through the lower strap slot to position a first end of the lower strap inside the chamber and a second end of the lower strap outside the chamber, a shoulder strap assembly extending through the at least one upper strap slot to position a first end of the shoulder strap assembly inside the chamber and a second end of the shoulder strap assembly outside the chamber, means disposed inside of the chamber for interconnecting the first ends of the lower strap and the shoulder strap assembly, the second end of the shoulder strap assembly being connected to the lower strap at a location near the second end of the lower strap, and means for adjustably coupling the second end of the lower strap to the upper shell portion.

28. The device of claim 21, further comprising stop means on the lower shell portion for engaging the upper shell portion to limit pivotal movement of the upper shell portion relative to the lower shell portion to a predetermined range of angular positions between the planar orientation and the angular orientation.

29. The device of claim 28, wherein the stop means includes first and second shoulders formed on the lower shell portion and an arm member formed on the upper shell portion and situated to lie between the first and second shoulders, the arm member moving between a first position abutting the first shoulder when the upper shell portion is situated in the generally planar orientation and a second position abutting the second shoulder when the upper shell portion is situated in the angular orientation.

30. A restraint device for securing and supporting an infant, the device comprising
    an upper shell portion, a lower shell portion, means for pivotably connecting the upper shell portion to the lower shell portion to permit movement of the upper shell portion relative to the lower shell portion between a first generally planar orientation and a second angular orientation, the connected upper and lower shell portions defining a chamber sized to receive the infant, means for supporting a lower portion of the infant, the supporting means including a lower support surface situated inside the chamber and adjacent to the lower shell portion, the lower support surface including an upper section, a lower section, and a flexible portion interconnecting the upper and lower sections, the flexible portion bending to move from a first position in which the upper and lower sections of the lower support surface are generally co-planar to a second position in which the upper and lower sections of the lower support surface are situated at an angle with respect to each other in response to movement of the upper shell portion from the angular orientation to the planar orientation, and means for coupling the lower support surface to the lower shell portion and to the upper shell portion to provide a generally planar seat for the infant when the upper and lower shell portions are in the second angular orientation, the lower support surface bending along the flexible portion in response to movement of the upper shell portion relative to the lower shell portion from the second angular orientation to the first generally planar orientation.

31. The device of claim 30, wherein the upper section of the lower support surface is coupled to the upper shell portion by flexible straps.

32. A restraint device for securing and supporting an infant, the device comprising an upper shell portion, a lower shell portion, means for pivotably connecting the upper shell portion to the lower shell portion to permit movement of the upper shell portion relative to the lower shell portion between a first generally planar orientation and a second angular orientation, the connected upper and lower shell portions defining a chamber sized to receive the infant, the connecting means including a pivot assembly located in close proximity to a top edge of the upper and lower shell portions to permit an open end of the upper shell portion to nest within the lower shell portion upon movement of the upper and lower shell portions from the angular orientation to the planar orientation, means for supporting a lower portion of the infant, the supporting means including a lower support surface situated inside the chamber and adjacent to the lower shell portion, the lower support surface including a flexible portion, and means for coupling the lower support surface to the lower shell portion and to the upper shell portion to provide a generally planar seat for the infant when the upper and lower shell portions are in the second angular orientation, the lower support surface bending along the flexible portion in response to movement of the upper shell portion relative to the lower shell portion from the second angular orientation to the first generally planar orientation.

* * * * *